United States Patent [19]

Iwamoto et al.

[11] 4,437,311
[45] Mar. 20, 1984

[54] APPARATUS FOR CONTROLLING THE FLOW OF EXHAUST GAS IN AN INTERNAL COMBUSTION ENGINE WITH A TURBOCHARGER AND A CATALYTIC CONVERTER

[75] Inventors: Kenzi Iwamoto, Nishio; Katsuhiro Omata, Souwamachi, both of Japan

[73] Assignee: Nippon Soken, Inc., Nishio, Japan

[21] Appl. No.: 374,894

[22] Filed: May 4, 1982

[30] Foreign Application Priority Data

May 7, 1981 [JP] Japan ............................. 56-065031

[51] Int. Cl.³ .......................... F01N 5/04; F02B 37/00
[52] U.S. Cl. .................................. 60/602; 60/280
[58] Field of Search ................. 60/280, 600, 601, 602, 60/603

[56] References Cited

U.S. PATENT DOCUMENTS

| 4,197,711 | 4/1980 | Fuhrmann et al. | 60/602 |
| 4,235,076 | 11/1980 | Meloche et al. | 60/602 |
| 4,244,187 | 1/1981 | Lane et al. | 60/602 |

FOREIGN PATENT DOCUMENTS 2483515 12/1981 France ............................. 60/602

Primary Examiner—Michael Koczo
Attorney, Agent, or Firm—Cushman, Darby & Cushman

[57] ABSTRACT

An apparatus for controlling the flow of the exhaust gas in an internal combustion engine including a turbocharger, a catalytic converter in an exhaust duct, and a throttle valve in an intake duct, wherein the apparatus comprises a bypass passage bypassing a turbine of the turbocharger, a waste gate valve which controls the amount of the exhaust gas passing therethrough, an actuator for actuating the waste gate valve which has first and second pressure chambers separated from one another, and a switching valve which selectively connects the second pressure chamber to the atmosphere or to the intake vacuum area, the first pressure chamber being connected to the delivery pressure area of the turbocharger by means of a conduit which is connected to an atmospheric pressure area via a restriction.

8 Claims, 4 Drawing Figures

APPARATUS FOR CONTROLLING THE FLOW OF EXHAUST GAS IN AN INTERNAL COMBUSTION ENGINE WITH A TURBOCHARGER AND A CATALYTIC CONVERTER

BACKGROUND OF THE INVENTION

1. Field of the Invention

This invention relates to an apparatus for controlling the flow of the exhaust gas in an internal combustion engine with a turbocharger.

2. Description of the Prior Art

In an internal combustion engine having a turbocharger which includes an exhaust gas driven turbine and an air compressor connected to the turbine by means of a turboshaft, there is usually provided an exhaust gas bypass passage which bypasses the turbine and which connects the portions of an exhaust duct on the upstream and downstream sides of the turbine. The bypass passage has therein a waste gate valve to control the amount of the exhaust gas passing therethrough. The waste gate valve is operated by an actuator which operates in response to the delivery pressure of the air compressor. The actuator opens the waste gate valve when the delivery pressure is above a predetermined value, so that almost all or part of the exhaust gas flows through the bypass passage and is discharged into the atmosphere without being fed to the turbine, and closes the waste gate valve when the delivery pressure is below the predetermined value, so that the exhaust gas is fed to the turbine to drive the same.

However, some internal combustion engines also have catalytic converters located in the exhaust duct on the downstream side of the turbine of the turbocharger to purify the exhaust gas. In such cases, since the bypass passage is closed by the waste gate valve immediately after the engine is started and all of the exhaust gas is fed to the turbine, the exhaust gas which is finally fed into the catalytic converter is decreased in temperature, since the turbine has a large heat capacity. Namely, the heat of the exhaust gas is partly lost in the turbine. The decrease of the temperature of the exhaust gas makes it impossible for the temperature of the catalyst to quickly rise, resulting in a poor exhaust gas purification efficiency of the catalytic converter and in a poor emission control.

In order to solve these problems, there has been proposed an actuator, for operating the waste gate valve, which has two pressure chambers separated by a diaphragm, the first pressure chamber being connected to the portion of an intake duct on the downstream side of the air compressor, so that the delivery pressure of the compressor acts on the first pressure chamber, and the second pressure chamber being connected to the portion of the intake duct or carburetor on the downstream side of a throttle valve in the carburetor, so that the intake vacuum acts on the second pressure chamber. The first pressure chamber is adapted to control the waste gate valve in order to prevent the delivery pressure of the air compressor from becoming larger than a predetermined value. The second pressure chamber is adapted to control the waste gate valve especially at a partial load driving condition until the temperature of an engine coolant or the catalyst reaches a predetermined value in order to improve the exhaust gas emission, particularly, immediately after the engine is cold-started.

However, in an actuator having two pressure chambers which, on one hand, controls the amount of the bypassing exhaust gas in response to the delivery pressure of the air compressor to prevent the delivery pressure from being above a predetermined value and which, on the other hand, controls the bypassing exhaust gas in response to the intake vacuum at a partial load driving to improve the emission, the waste gate valve opens, on one hand, when the intake vacuum is superior to an initial spring load $W_0$ of the waste gate valve and, on the other hand, when the delivery pressure is superior to the initial spring load $W_0$. That is, a value $P_{BL}$ of the intake vacuum $P_B$ at which the waste gate valve begins opening and a value $P_{dL}$ of the delivery pressure $P_d$ of the air compressor at which the waste gate valve begins opening are identical to each other, provided that the directions of action of the intake vacuum and the delivery pressure are opposite to each other. That is, $P_{dL} = -P_{BL}$.

The upper limit of the delivery pressure of the air compressor of the turbocharger is determined taking both the prevention of engine breakage and the requirement of increased engine output into consideration. In most cases, the initial spring load $W_0$ of the actuator of the waste gate valve is set to be equal to the upper limit of the delivery pressure of the air compressor. That is, $W_0$ is usually equal to $P_{dL}$ so as to obtain a maximum engine output. In order to improve the emission control, that is, in order to ensure a quick rise of the temperature of the catalyst especially when the engine is not yet warmed up, it is necessary to widen the active range of the intake vacuum in which the actuator can be actuated, particularly at a partial load of the engine. That is, it is necessary to decrease the minimum value of the intake vacuum necessary for actuating the actuator (for example, from $-350$ mmHg to $-100$ mmHg). However, decreasing the minimum value of the intake vacuum necessary for actuating the actuator means decreasing the upper limit (maximum value) of the delivery pressure of the air compressor (for example, from $+350$ mmHg to $+100$ mmHg), which, in turn, leads to a decrease of the engine output.

SUMMARY OF THE INVENTION

The primary object of the present invention is, therefore, to provide an apparatus for controlling the flow of the exhaust gas to accelerate the warming up of the catalytic converter without decreasing the maximum engine output, by widening the active range of the intake vacuum necessary for actuating the waste gate valve at a partial load driving without decreasing the upper limit of the delivery pressure of the turbocharger, so that a large amount of exhaust gas can be directly fed to the catalytic converter through a bypass passage without going through the turbine of the turbocharger, before the engine is warmed up.

BRIEF DESCRIPTION OF THE DRAWINGS

The invention will be now described below in detail with reference to the drawings, in which.

DETAILED DESCRIPTION OF THE INVENTION

Figure 1:
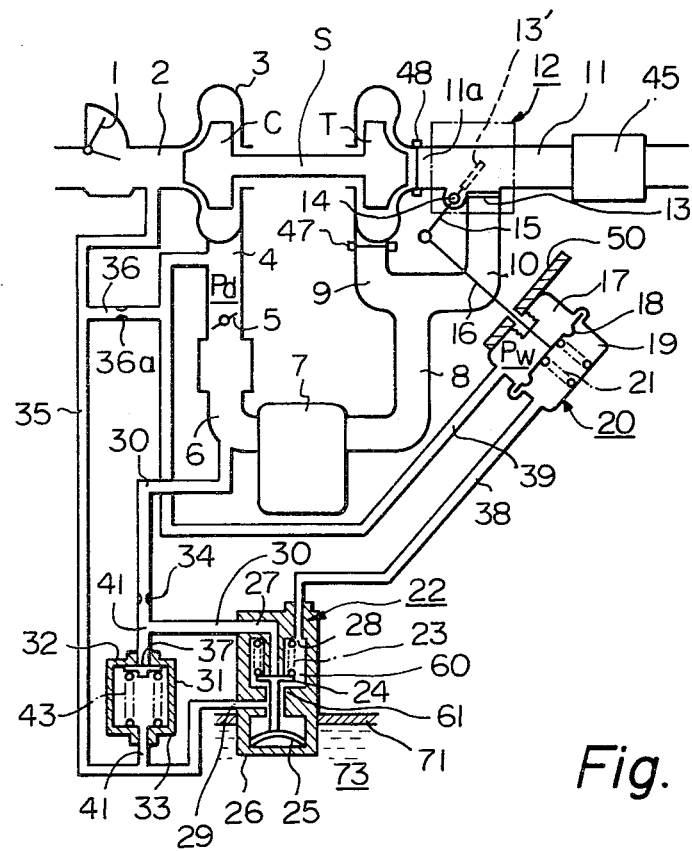
FIG. 1 is a partially sectioned schematic view of a control apparatus according to the present invention.

In FIG. 1, numeral 1 designates an air flow meter which meters the amount of the intake air introduced into an engine 7 and which is connected to an air compressor C of a turbocharger 3 by means of an intake duct 2. The delivery side of the compressor C is connected to an intake manifold 6 by means of an intake duct 4. In the intake duct 4 is provided a throttle valve 5 which is actuated by an acceleration pedal (not shown) to control the engine output. An exhaust manifold 8 connected to the engine 7 is bifurcated, on its downstream side, into two branch passages. One of the branch passages is an exhaust inlet pipe 9 connected to an inlet side of a turbine T of the turbocharger 3, and the other passage is a bypass passage 10 which bypasses the turbine T. The turbine T is connected to the compressor C by means of a turboshaft S. The bypass passage 10 opens into an exhaust duct 11 connected to an outlet side of the turbine T. A waste gate valve unit 12 having a control valve 13 is provided at a connection between the exhaust duct 11 and the bypass passage 10. The control valve 13 is mounted to a rotating shaft 14 which has an arm 15 connected thereto. The arm 15 is operatively linked to a control rod 16 of an actuator which is in the form of a diaphragm device 20 in the illustrated embodiment. The diaphragm device 20 is supported by a proper immovable portion 50 of an associated vehicle provided with the engine. The control rod 16 is connected to a diaphragm 18 of the diaphragm device 20 so that it moves together with the diaphragm 18. The diaphragm device 20 has first and second pressure chambers 17 and 19 divided by the diaphragm 18. A compression spring 21 is arranged in the second pressure chamber 19 to continuously push the diaphragm toward the first pressure chamber 17.

A bimetallic switching valve unit 22 is mounted to a cylinder block 71 of the engine 7. The valve unit 22 has a thermal sensitive head 26 projecting into a water jacket 73 of an engine coolant. The valve unit 22 has a movable valve body 24 in a valve chamber 60 having a valve opening 61. The valve body 24 is biased by a spring 23 downward in FIG. 1. The valve unit 22 has three valve ports 27, 28 and 29 which are selectively connected to each other by the valve body 24. When the valve body 24 is in its first position in which the valve opening 61 is closed by the valve body 24, the first valve port 27 communicates with the second valve port 28. When the valve body 24 is in its second position in which the valve opening 61 opens, as shown in FIG. 1, and in which the first valve port 27 is closed by the valve body 24, the third valve port 29 communicates with the second valve port 28 through the valve opening 61. The valve body 24 continuously bears against a bimetallic element 25 arranged in the thermal sensitive head 26, with the help of the spring 23, so that the deformation of the bimetallic element 25 due to variation of temperature of the engine coolant in the water jacket 73 is transmitted to the valve body 24.

The valve port 27 is connected to the intake manifold 6 downstream the throttle valve 5 by means of a conduit 30 which has therein an orifice or restriction 34. The valve port 29 is connected to the intake duct 2 downstream of the air flow meter 1 and upstream of the air compressor C by means of a conduit 35. The conduit 35 is connected to the conduit 30 by means of a conduit 41 which has therein a non-return valve 31. The restriction 34 is located in the conduit 30 between the intake manifold 6 and the connection between the conduits 30 and 41. The non-return valve 31 has a valve chamber 43 having a valve port 37 which is selectively opened and closed by a valve body 32. The valve body 32 is arranged in the valve chamber 43 and is biased by a spring 33 toward a valve closed position in which the valve port 37 is closed.

The second valve port 28 of the bimetallic switching valve unit 22 is connected to the second chamber 19 of the diaphragm device 20 by means of a conduit 38. The first chamber 17 of the diaphragm device 20 is connected to the intake duct 4 upstream of the throttle valve 5 and downstream of the compressor C, by means of a conduit 39. The conduit 39 is connected to the conduit 35 via a conduit 36 which has therein an orifice or a restriction 36a, so that a pressure difference $P_f$ occurs between the pressure in the intake duct 4, i.e., the delivery pressure $P_d$ of the compressor C, and the pressure $P_w$ in the first pressure chamber 17 of the diaphragm device 20, due to the presence of the restriction 36a. The pressure difference $P_f$ depends on the diameter of the restriction 36a. It is also possible to open the conduit 36 into the atmosphere, in place of connection to the conduit 35. The numeral 45 designates a catalytic converter arranged in the exhaust duct 11.

The apparatus as constructed above, according to the present invention operates as follows (See FIGS. 1, 2, 3, and 4).

When the engine 7 is driven, the intake air metered by the air flow meter 1 is fed to the compressor C via the intake duct 2 and is compressed by the compressor, so that the pressure of the intake air rises. The compressed air is fed into the intake manifold 6 via the intake duct 4. Fuel is fed by a fuel feeding device (not shown), such as a fuel injector, into the compressed air and is mixed therewith to form a mixture which is fed to the engine. The exhaust gas discharged from the engine 7 is discharged into the exhaust manifold 8 and, then, partly into the exhaust inlet pipe 9 and partly into the bypass passage 10. The exhaust gas fed into the exhaust inlet pipe 9 drives the turbine T and is then discharged in the exhaust duct 11. Then, the exhaust gas joins the exhaust gas from the bypass passage 10 and thereafter is fed to the catalytic converter 45 where the exhaust gas is purified.

When the temperature of the engine coolant in the water jacket 73 is above a predetermined value, the bimetallic element 25 of the valve unit 22 is curved to be convex, as shown in FIG. 1, so that the valve body 24 occupies the second position and closes the first valve port 27 and that the second valve port 28 is connected to the third valve port 29. Therefore, the second pressure chamber 19 of the diaphragm device 20 is connected to the intake duct 2 via the conduit 38, the valve chamber 60 of the valve unit 22, and the conduit 35, so that the second pressure chamber 19 becomes substantially atmospheric pressure. At this state, if the valve opening angle $\theta$ of the throttle valve 5 is small to $\theta_A$ (FIG. 3) near an idling angle $\theta_I$, almost no rise of the pressure of the intake air by the compressor C can be expected because of the small amount of the intake air. In addition, the atmospheric pressure acts on the conduit 39 through the restriction 36a. Accordingly, the pressure of the first pressure chamber 17 of the diaphragm device 20 is also substantially atmospheric pressure. It should be noted that although the intake vacuum (negative pressure) of the intake manifold 6 acts on the conduit 30, the second pressure chamber 19 is maintained substantially at atmospheric pressure because the valve port 37 of the non-return valve 31 and the valve port 27 of the valve unit 22 are both closed. Consequently, the diaphragm 18 is displaced toward the first chamber 17 by the spring 21, so that the control valve 13 occupies a closed position shown by a solid line in FIG. 1, in which the bypass passage 10 is closed by the control valve 13. Thus, all of the exhaust gas discharged from the engine 7 is fed to the turbine T to drive the latter.

On the other hand, when the throttle valve 5 is opened at large angle $\theta_B$ near a full throttle angle $\theta_F$ (FIG. 3), that is, when the engine drives at a high load, the large amount of the intake air is compressed by the compressor C so that the pressure of the intake air highly rises. Consequently, the pressure in the intake duct 4 and in the intake manifold 6 is above atmospheric pressure. The positive pressure in the intake manifold 6 is transmitted to the valve opening 37 of the relief valve 31 through the conduit 30 and via the restriction 34. As soon as the pressure acting on the valve body 32 from the side of the conduit 30 becomes larger than atmospheric pressure, the valve body 32 causes the valve port 37 to open, so that the air in the conduit 30 downstream of the restriction 34 enters the valve chamber 43 of the non-return valve 31. As soon as air having a positive pressure enters the valve chamber 43, the pressure of the air in the conduit 30 between the restriction 34 and the non-return valve 31 drops, so that the valve body 32 closes the valve port 37. Therefore, the atmospheric pressure in the conduit 35 is substantially free from the positive pressure in the conduit 30 and, accordingly, the second pressure chamber 19 of the diaphragm device 20 is substantially kept at atmospheric pressure.

Figure 2:
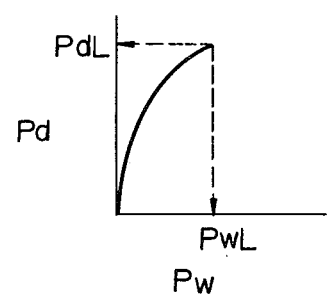
FIG. 2 is a diagram showing the relationship between a pressure $P_w$ in a first pressure chamber of a diaphragm device which is adapted to actuate a waste gate valve and a delivery pressure $P_d$ of a turbocharger.
Figure 3:
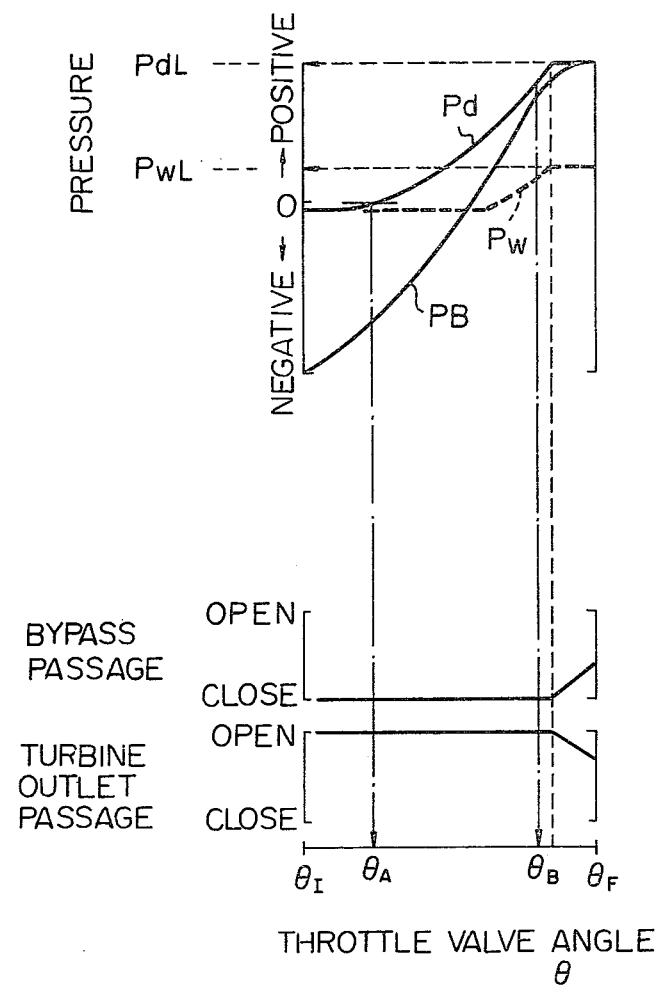
FIGS. 3 and 4 are diagrams showing characteristics of a control apparatus of the present invention vis-a-vis a valve angle of a throttle valve, after and before the engine is warmed up, respectively.

The positive pressure in the intake duct 4 is transmitted to the first pressure chamber 17 of the diaphragm device 20 via the conduit 39. However, since the conduit 39 is connected to the intake duct 2, by means of the conduit 36 having therein the restriction 36a, the pressure difference $P_f$ occurs between the delivery pressure $P_d$ in the intake duct 4 and the pressure $P_w$ in the first pressure chamber 17 ($P_f = P_d - P_w > 0$). The difference $P_f$ depends on the diameter of the restriction 36a. The relationship between $P_d$ and $P_w$ is illustrated in FIG. 2. A maximum value $P_{wL}$ of the pressure $P_w$ corresponding to the upper limit $P_{dL}$ of the delivery pressure can be selected from FIG. 2. The initial spring load $W_0$ of the spring 21 is set to be equal to $P_{wL}$, so that when the pressure $P_w$ becomes larger than the spring load $W_0$ of the spring 21, the diaphragm 18 is displaced toward the second chamber 19 against the spring 21. This displacement of the diaphragm 18 causes the control valve 13 of the waste gate valve unit 12 to come to its partially open position 13' in which the bypass passage 10 opens, so that part of the exhaust gas flows through the bypass passage 10, resulting in reduction of the amount of the exhaust gas fed to the turbine T. As a result of the reduction, the number of revolutions of the turbocharger 3 decreases, which results in the drop of the delivery pressure $P_d$. When the pressure $P_d$ becomes smaller than the upper limit $P_{dL}$, the pressure $P_w$ in the first chamber 17 of the diaphragm device 20 also becomes smaller than the maximum value $P_{wL}$, as can be seen from FIG. 2. Consequently, the diaphragm 18 is displaced again toward the first chamber 17 by the spring 21, so that the bypass passage 10 is again closed by the control valve 13. When the bypass passage 10 is closed, all of the exhaust gas in the exhaust manifold 8 is fed to the turbine T to increase the number of revolutions of the turbocharger 3. The operation mentioned above is repeated. Thus, the delivery pressure $P_d$ is prevented from becoming higher than the upper limit $P_{dL}$, at a high load driving condition of the engine 7. The turbine outlet passage referred to in FIG. 3 is designated as 11a in FIG. 1.

Figure 4:
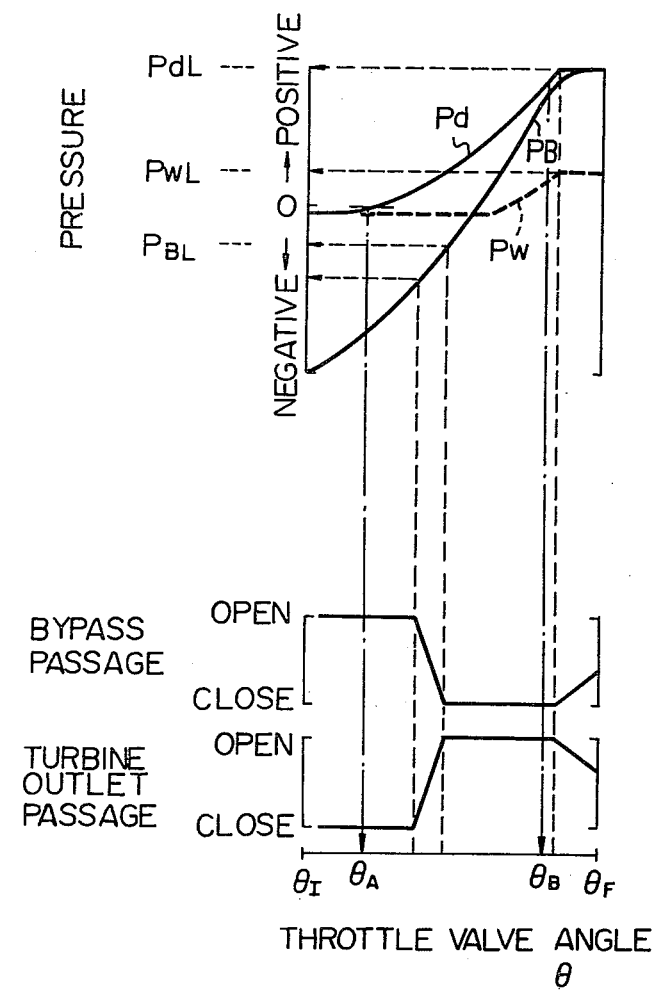

The discussion will be now directed to the case where the temperature of the engine coolant is below a predetermined value, for example, when the engine is not yet warmed up (See FIG. 4). When the engine coolant's temperature is below a predetermined value, the bimetallic element 25 of the switching valve unit 22 is deformed to be concave, contrary to the position shown in FIG. 1, so that the valve body 24 moves downward in FIG. 1 by the spring 23. The downward movement of the valve body 24 causes the valve opening 61 to be closed and the first valve port 27 to open. In this position of the valve unit 22, the second pressure chamber 19 of the diaphragm device 20 is connected to the intake manifold 6, via the conduit 38, the second valve port 28, the first valve port 27, and the conduit 30 having the restriction 34. If the valve angle $\theta$ of the throttle valve 5 is small at $\theta_A$ near the idle angle $\theta_I$ (FIG. 4), the first chamber 17 of the diaphragm device 20 is kept substantially at atmospheric pressure, as mentioned before, with respect to FIG. 3. The intake vacuum in the intake manifold 6 is transmitted to the second chamber 19, via the conduit 30, the valve port 27, the valve port 28, and the conduit 38. Since the valve port 37 is closed by the valve body 32 due to the vacuum (negative pressure) in the conduit 30, the intake vacuum $P_B$ in the conduit 30 downstream of the restriction 34 directly acts upon the second chamber 19. Consequently, the diaphragm 18 is largely displaced toward the second pressure chamber 19 against the spring 21, so that the turbine outlet passage 11a is closed by the control valve 13 and that the bypass passage is almost completely opened, thus resulting in a large amount of exhaust gas flowing through the bypass passage 10.

On the other hand, when the throttle valve angle $\theta$ is large at $\theta_B$ near the full throttle angle $\theta_F$ (FIG. 4) to drive the engine at a high load, the positive pressure $P_d$ in the intake duct 4 is introduced into the first chamber 17 of the diaphragm device 20, ehile satisfying the relationship between $P_d$ and $P_w$, shown in FIG. 2. When the pressure $P_w$ becomes larger than the maximum value $P_{wL}$, the control valve 13 causes the bypass passage 10 to open, as mentioned before, with respect to FIG. 3. Also, as mentioned before, with regard to FIG. 3, the second chamber 19 is maintained substantially at atmospheric pressure. Thus, the pressure $P_d$ does not become larger than the upper limit $P_{dL}$, also at a high load driving.

As can be understood from the above description, according to the present invention, since there is provided a pressure difference $P_f$ between the delivery pressure $P_d$ of the compressor of the turbocharger and the pressure $P_w$ in the first pressure chamber of the diaphragm device, the initial spring load $W_0$ of the diaphragm device can be decreased, particularly at a partial load driving, that is, the active range of the intake vacuum necessary for actuating the diaphragm device i.e., the waste gate valve unit, can be widened.

As a result of this wider active range of intake vacuum for actuating the waste gate valve unit, a large amount of exhaust gas can be directly fed to the catalytic converter through the bypass passage without going through the turbine, even before the engine is warmed up. Namely, exhaust gas of a high temperature, i.e., not losing heat in the turbine, can be fed to the catalytic converter even before the warming up of the engine is completed, so that the converter can be rapidly warmed, thereby improving the emission control.

Preferably, the turbine inlet portion and the turbine outlet portion are connected to the exhaust inlet passage 9 and the exhaust outlet passage 11a, by means of heat insulating gaskets 47 and 48, respectively, in order to decrease the amount of heat transmitted from the exhaust inlet passage 9 and the exhaust outlet passage 11a to the turbine.

Finally, in the illustrated embodiment, although the switching valve unit 22 operates in response to the temperature of the engine coolant, the temperature of a catalyst bed or of an engine oil can be used in place of the engine coolant's temperature. Furthermore, the waste gate valve unit may be located on the exhaust inlet side of the turbine, instead of on the exhaust outlet side thereof, as shown in FIG. 1.

We claim:

1. An apparatus for controlling the flow of the exhaust gas in an internal combustion engine including a turbocharger having a compressor in an intake duct and having an exhaust gas driven turbine in an exhaust duct connected to the compressor, a catalytic converter arranged in the exhaust duct downstream of the turbine, and a throttle valve arranged in the intake duct between the engine and the compressor to control the engine output, said apparatus comprising a bypass passage which bypasses the turbine and which extends between the upstream and downstream sides of the turbine, a waste gate valve unit which controls the amount of the exhaust gas passing through the waste gate valve unit, an actuator for actuating the waste gate valve unit, which has first and second pressure chambers separated by a spring biased diaphragm, and a thermal switching valve unit which selectively connects one of the pressure chambers of the actuator with the atmosphere or the intake duct downstream of the throttle valve, the other pressure chamber of the actuator being connected to the intake duct downstream of the compressor and upstream the throttle valve by means of a conduit which is connected to an atmospheric pressure area via a restriction.

2. An apparatus according to claim 1, wherein said thermal switching valve unit comprises a bimetallic element which deforms due to variation of temperature and a valve body connected to the bimetallic element.

3. An apparatus according to claim 2, wherein said thermal switching valve unit comprises a thermal sensitive head in which said bimetallic element is arranged and which detects the temperature of the engine.

4. An apparatus according to claim 2, wherein said thermal switching valve unit comprises three ports, of which the first port is connected to the intake duct downstream of the throttle valve by means of a conduit, the second port being connected to the second pressure chamber, by means of a conduit, the third port being connected to the intake duct upstream of the compressor, said second port being selectively connected to the first port or third port in accordance with the movement of the valve body due to the deformation of the bimetallic element, in such a way that said second port is connected to the third port when the engine temperature is above a predetermined value, and said second port is connected to the first port when the engine temperature is below a predetermined value.

5. An apparatus according to claim 4, wherein said conduit for connecting the third port and the intake duct is connected to said conduit for connecting the first port and the intake duct by means of a conduit which has therein a non-return valve unit which opens only when the pressure in the first mentioned conduit is above the pressure in the second mentioned conduit.

6. An apparatus according to claim 5, wherein said conduit for connecting the first port and the intake duct has therein a restriction located between the intake duct and the connection between the conduit connecting the non-return valve and the first mentioned conduit.

7. An apparatus according to claim 6, wherein said first pressure chamber of the actuator is connected to the intake duct downstream of the compressor by means of a conduit which is in turn, connected to the conduit connecting the third port of the switching valve unit and the intake duct upstream of the compressor by means of a conduit having a restriction therein.

8. An apparatus according to claim 1, wherein said turbine is connected at its inlet and outlet sides, to the exhaust duct by means of heat insulating gaskets.

* * * * *